United States Patent
Csonka et al.

(10) Patent No.: US 11,206,088 B2
(45) Date of Patent: Dec. 21, 2021

(54) POWER ADJUSTMENT OF A COMMUNICATION LINK BASED ON STATE DISTURBANCE ESTIMATIONS

(71) Applicant: X Development LLC, Mountain View, CA (US)

(72) Inventors: Paul Csonka, Redwood City, CA (US); Travis Lantz, Dublin, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/156,725

(22) Filed: Jan. 25, 2021

(65) Prior Publication Data

US 2021/0143914 A1    May 13, 2021

Related U.S. Application Data

(63) Continuation of application No. 16/829,110, filed on Mar. 25, 2020, now Pat. No. 10,931,379, which is a continuation of application No. 16/251,392, filed on Jan. 18, 2019, now Pat. No. 10,637,579.

(51) Int. Cl.

| | |
|---|---|
| *H04B 10/564* | (2013.01) |
| *H04B 17/318* | (2015.01) |
| *H04B 17/10* | (2015.01) |
| *H04B 10/079* | (2013.01) |
| *H04B 10/07* | (2013.01) |
| *H04B 17/00* | (2015.01) |
| *H04B 10/40* | (2013.01) |
| *H04B 10/50* | (2013.01) |
| *H04B 10/60* | (2013.01) |

(52) U.S. Cl.
CPC ..... *H04B 10/564* (2013.01); *H04B 10/07955* (2013.01); *H04B 17/102* (2015.01); *H04B 17/318* (2015.01); *H04B 10/07* (2013.01); *H04B 10/40* (2013.01); *H04B 10/50* (2013.01); *H04B 10/60* (2013.01); *H04B 17/00* (2013.01)

(58) Field of Classification Search
None
See application file for complete search history.

(56) References Cited

U.S. PATENT DOCUMENTS

| | | | |
|---|---|---|---|
| 4,188,543 A | 2/1980 | Brunsting et al. | |
| 6,339,495 B1 * | 1/2002 | Cowie | H04B 10/296 359/337.1 |
| 6,347,008 B1 | 2/2002 | Vodhanel | |
| 9,228,922 B1 | 1/2016 | Doddridge | |
| 2002/0048062 A1 * | 4/2002 | Sakamoto | H04B 10/2569 398/30 |
| 2003/0219253 A1 * | 11/2003 | Kukshya | H04B 10/1121 398/118 |

(Continued)

*Primary Examiner* — Darren E Wolf
(74) *Attorney, Agent, or Firm* — Botos Churchill IP Law

(57) ABSTRACT

A communication device is provided that estimates one or more disturbance values associated with one or more components of the communication device, and adjusts the communication device to change a received power of the output signal. The communication device includes a transmitter having a seed laser configured to provide an amount of bandwidth for an output signal, an Erbium-doped fiber amplifier (EDFA) configured to increase an amplitude of the output signal, and a single mode variable optical attenuator (SMVOA) configured to decrease the amplitude of the output signal.

18 Claims, 4 Drawing Sheets

(56) References Cited

U.S. PATENT DOCUMENTS

| | | | |
|---|---|---|---|
| 2005/0225840 A1 | 10/2005 | Drasek et al. | |
| 2006/0203329 A1 | 9/2006 | Nishihara et al. | |
| 2009/0135761 A1* | 5/2009 | Khandekar | H04W 52/244 370/328 |
| 2009/0214215 A1* | 8/2009 | Li | H04J 14/02 398/81 |
| 2012/0033971 A1* | 2/2012 | Fourcand | H04Q 11/0478 398/54 |
| 2016/0098676 A1* | 4/2016 | Kusens | G06Q 30/0261 705/26.9 |
| 2016/0157075 A1* | 6/2016 | Ho | H04W 4/90 455/404.2 |
| 2018/0054793 A1* | 2/2018 | Renaldi | H04W 64/00 |
| 2018/0063676 A1* | 3/2018 | Mycek | G01S 5/02 |
| 2019/0104422 A1* | 4/2019 | Chiang | H04W 12/06 |
| 2019/0148904 A1* | 5/2019 | Tanaka | H01S 3/0085 359/341.3 |

* cited by examiner

POWER ADJUSTMENT OF A COMMUNICATION LINK BASED ON STATE DISTURBANCE ESTIMATIONS

CROSS REFERENCE TO RELATED APPLICATIONS

The present application is a continuation of U.S. patent application Ser. No. 16/829,110, filed Mar. 25, 2020, which is a continuation of U.S. patent application Ser. No. 16/251,392, filed Jan. 18, 2019, now U.S. Pat. No. 10,637,579, the disclosures of which are incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The mechanisms of communication terminals may vary physically due to differences in operation over time. For example, mechanisms may be cycled through large temperature ranges and experience significantly varying plant (mechanism) characteristics. Mechanisms may wear with use, which may change friction and viscosity characteristics. Mechanisms may also have components that reduce performance using traditional controls techniques. In these situations, it may be difficult to compensate for the variability caused by the changes in the components in order to obtain reliable operation of a communication terminal.

BRIEF SUMMARY

Aspects of the disclosure provide for a communication system. The communication system includes one or more sensors configured to receive measurements related to a state of the communication system; a transmitter configured to transmit an outbound signal to a remote communication system; a receiver configured to receive an inbound signal from the remote communication system; and one or more processors in communication with the one or more sensors, the transmitter, and the receiver. The one or more processors are configured to receive, using the one or more sensors, one or more measurements related to the state of the communication system during a first timeframe; receive, from the remote communication system, an indication of an amount of received power at the remote communication system during the first timeframe; estimate a plurality of disturbance values to the communication system for the first timeframe and a second timeframe smaller than the first timeframe according to the one or more measurements and the indication, each disturbance value being an average amount of change in power over a given timeframe associated with a set of components of the communication system; and adjust a given component of the communication system from the set of components to cause a change in power of a signal to be transmitted from the communication system to the remote communication system based on the plurality of disturbance values.

In one example, the one or more processors are configured to estimate the plurality of disturbance values based on a first disturbance value estimated by determining an average amount of change of the indication over the second timeframe equal to or on the same order of the first timeframe; and a second disturbance value estimated by subtracting the first disturbance value from the received indication and then determining an average amount of change of the indication over a third timeframe less than the second timeframe. In another example, the one or more processors are configured to estimate the plurality of disturbance values based on the set of components associated with each disturbance value. In this example, the one or more processors are further configured to identify the set of components based on: a determination that a time constant for a variation of the set of components is a same or similar value as the given timeframe for an estimated disturbance value; a determination that a detected change in the received measurements associated with the set of components is a likely cause of an estimated disturbance value; or an identification of a known change in behavior of the set of components associated with a received measurement.

In a further example, the one or more processors are configured to adjust the given component by controlling the transmitter to increase or decrease power of the outbound signal. In yet another example, the system is a free-space optical communication system; the transmitter is configured to transmit an optical outbound signal to the remote communication system; and the receiver is configured to receive an optical inbound signal from the remote communication system. In a still further example, the one or more processors are further configured to receive an updated indication; estimate one or more updated disturbance values; and adjust the given component based on the one or more updated disturbance values.

Other aspects of the disclosure provide for a method for adjusting a component of a communication device. The method includes receiving, by one or more processors of the communication device, one or more measurements related to a state of the communication device during a first timeframe; receiving, by the one or more processors, an indication of an amount of received power at a remote communication device during the first timeframe; estimating, by the one or more processors, a plurality of disturbance values to the communication device for the first timeframe and a second timeframe smaller than the first timeframe according to the one or more measurements and the indication, each disturbance value being an average amount of change in power over a given timeframe associated with a set of components of the communication device; and adjusting, by the one or more processors, a given component of the communication device from the set of components to cause a change in power of a signal to be transmitted from the communication device to the remote communication device based on the plurality of disturbance values.

In one example, estimating the plurality of disturbance values includes estimating a first disturbance value by determining an average amount of change of the indication over the second timeframe equal to or on the same order of the first timeframe; and estimating a second disturbance value may by subtracting the first disturbance value from the received indication and then determining an average amount of change of the indication over a third timeframe less than the second timeframe. In another example, estimating the plurality of disturbance values includes identifying the set of components associated with each disturbance value. In this example, identifying the set of components includes determining that a time constant for a variation of the set of components is a same or similar value as the given timeframe for an estimated disturbance value. Alternatively in this example, identifying the set of components includes determining that a detected change in the received one or more measurements associated with the set of components is a likely cause of an estimated disturbance value. Also optionally in this example, identifying the set of components includes identifying a known change in behavior of the set of components associated with a received measurement.

In a further example, the method also includes receiving, by the one or more processors, an updated indication; estimating, by the one or more processors, one or more updated disturbance values; and adjusting, by the one or more processors, a given component based on the one or more updated disturbance values.

Further aspects of the disclosure provide for a non-transitory, tangible computer-readable storage medium on which computer readable instructions of a program are stored. The instructions, when executed by one or more processors of a first communication device, cause the one or more processors to perform a method. The method includes receiving one or more measurements related to a state of the first communication device during a first timeframe; receiving an indication of an amount of received power at a second communication device during the first timeframe; estimating a plurality of disturbance values to the first communication device for the first timeframe and a second timeframe smaller than the first timeframe according to the one or more measurements and the indication, each disturbance value being an average amount of change in power over a given timeframe associated with a set of components of the first communication device; and adjusting a given component of the first communication device from the set of components to cause a change in power of a signal to be transmitted from the first communication device to the second communication device based on the plurality of disturbance values.

In one example, estimating the plurality of disturbance values includes estimating a first disturbance value by determining an average amount of change of the indication over the second timeframe equal to or on the same order of the first timeframe; and estimating a second disturbance value may by subtracting the first disturbance value from the received indication and then determining an average amount of change of the indication over a third timeframe less than the second timeframe. In another example, estimating the plurality of disturbance values includes identifying the set of components associated with each disturbance value. In this example, identifying the set of components includes determining that a time constant for a variation of the set of components is a same or similar value as the given timeframe for an estimated disturbance value. Alternatively in this example, identifying the set of components includes determining that a detected change in the received measurements associated with the set of components is a likely cause of an estimated disturbance value. Also optionally in this example, identifying the set of components includes identifying a known change in behavior of the set of components associated with a received measurement.

DETAILED DESCRIPTION

Overview

The technology relates to a communication system configured to adjust the power of a communication link based on disturbances to the communication system. Power for a link should be adjusted to stay within a functional range of receiving sensors in order to provide continuous service to users. In particular, power should be high enough for the sensors to detect incoming signals but not so high so as to oversaturate the sensors in the communication system. Atmospheric fluctuations may cause the power received at a remote terminal to surge or drop. The communication system may be able to decrease or increase the power to counteract a surge or drop and maintain a constant or near constant received power at a remote communication device.

The features, described in more detail below, may provide for a communication system that is able to maintain a communication link at a more consistent received power, even in variable environments. By identifying components that cause a given disturbance, adjustments may be made that more efficiently address the disturbance over time. As a result, system availability and data throughput over a communication link may be increased, and a tracking system may be able to maintain a stable lock with higher percentage availability. The tracking system of the communication system may be operated more accurately such that less power is needed to maintain a lock on a communication link.

In addition, more accurate predictions may be made regarding overall performance of the communication system and adjustments to the communication system. There may be less heat generation, so the overall temperature of the system allows the components of the system to perform more optimally. The communication system may also have less waste of power and therefore have a longer operating lifetime.

Example Systems

Figure 1:
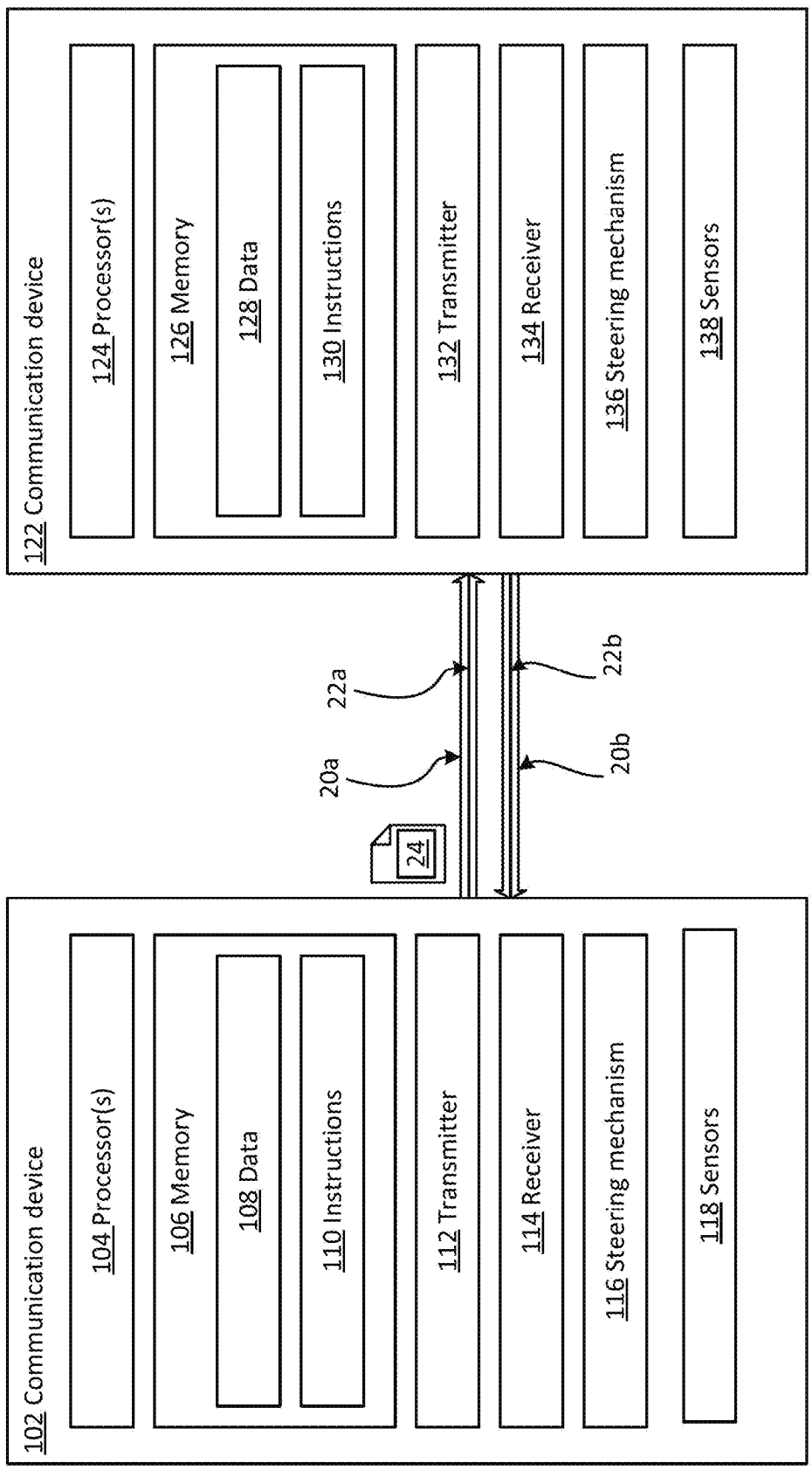
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

Figure 2:
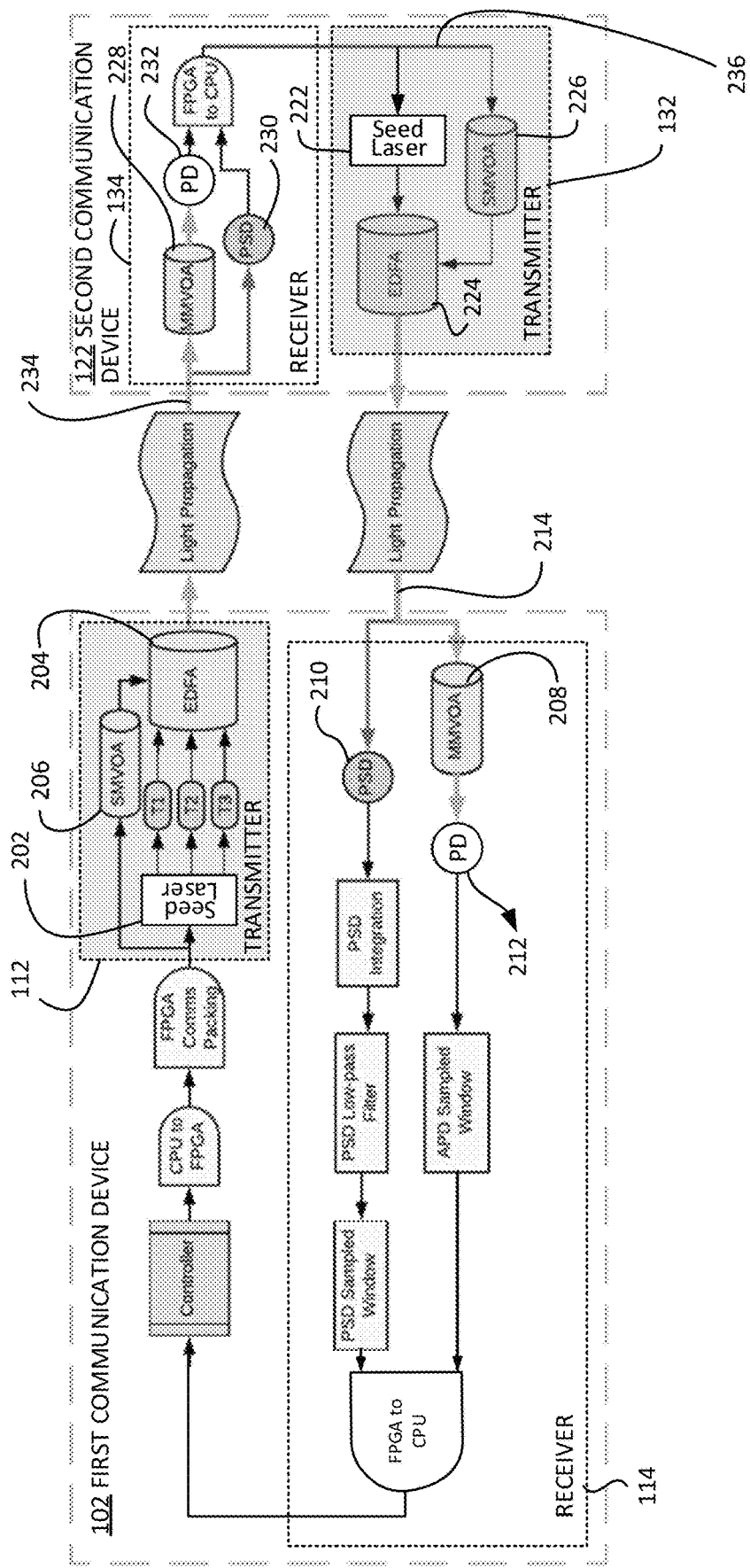
FIG. 2 is a pictorial diagram of components of the first communication device and the second communication device in accordance with aspects of the disclosure.

The transmitter 112 may include an optical transmitter, an amplifier, and an attenuator. As shown in FIG. 2, the transmitter 112 includes a seed laser 202 configured to provide an amount of bandwidth for an output signal, an Erbium-doped fiber amplifier (EDFA) 204 configured to increase an amplitude of the output signal, and a single mode variable optical attenuator (SMVOA) 206 configured to decrease the amplitude of the output signal. In addition, as shown in FIG. 1, the transmitter 112 may be configured to output a beacon beam 20 that allows one communication device to locate another, as well as a communication signal over a communication link 22. The output signal from the transmitter 112 may therefore include the beacon beam 20, the communication signal, or both. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

The receiver 114 includes a tracking system configured to detect an optical signal. As shown in FIG. 2, the receiver 114 for the first optical communication system 102 may include a multi-mode variable optical attenuator (MMVOA) 208 configured to adjust an amplitude of a received signal 214, a photosensitive detector (PSD) 210, and/or a photodiode (PD) 212. Using the PSD 210, the receiver 114 is able to detect a signal location and convert the optical signal 214 received from the second optical communication system 122 into an electric signal using a photoelectric effect. The receiver 114 is able to track the received optical signal 214, which may be used to direct the steering mechanism 116 to counteract disturbances due to scintillation and/or platform motion.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, or estimators, may be configured to monitor a state of the first communication device 102. The one or more sensors may include an inertial measurement unit (IMU), encoders, accelerometers, or gyroscopes and may include one or more sensors configured to measure one or more of pose, angle, velocity, torques, as well as other forces. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include an optical transmitter, an amplifier, and an attenuator. As shown in FIG. 2, the transmitter 132 includes a seed laser 222 configured to provide an amount of bandwidth for an output signal, an EDFA 224 configured to increase an amplitude of the output signal, and a SMVOA 226 configured to decrease the amplitude of the output signal. Additionally, as shown in FIG. 1, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes a tracking system configured to detect an optical signal as described above with respect to receiver 114. As shown in FIG. 2, the receiver 134 for the second optical communication system 122 may include a MMVOA 228 configured to adjust an amplitude of a received signal 234, a PSD 230, and/or a PD 232. Other components similar to those pictured in the first optical communication device 102 may also be included in the second optical communication device 122. Using the PSD 230, the receiver 134 is able to detect a signal location and convert the received optical signal 234 into an electric signal 236 using the photoelectric effect, which is fed from an output of the receiver 134 to an input of the seed laser 222 and an input of the SMVOA 226. The receiver 134 is able to track the received optical signal 234, which may be used to direct the steering mechanism 136 to counteract disturbances due to scintillation and/or platform motion.

Returning to FIG. 1, the one or more processors 124 are in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 3:
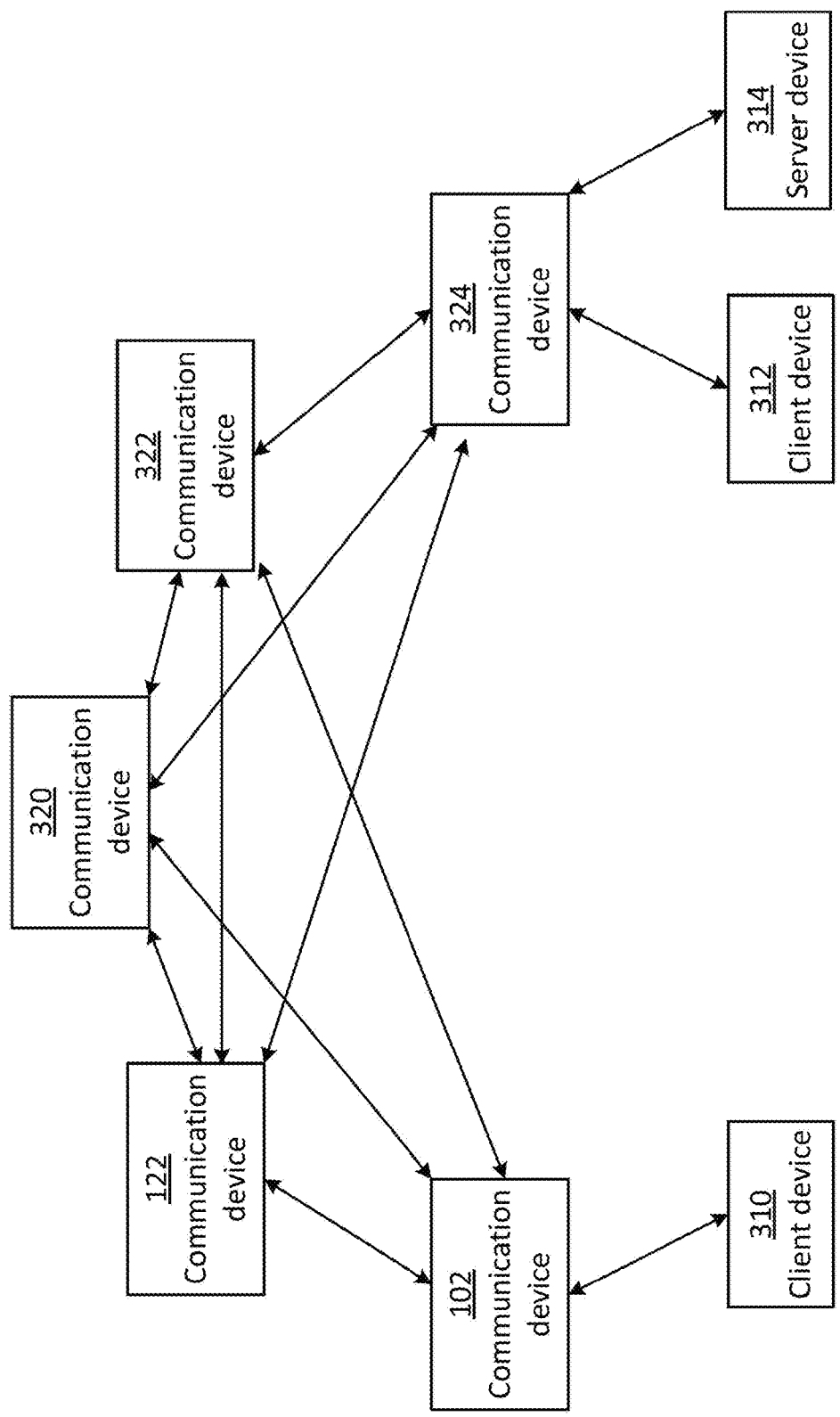
FIG. 3 is a pictorial diagram of a network 300 in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 300. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transmitter, a receiver, and a steering mechanism similar to those described above. Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network.

Example Methods

Figure 4:
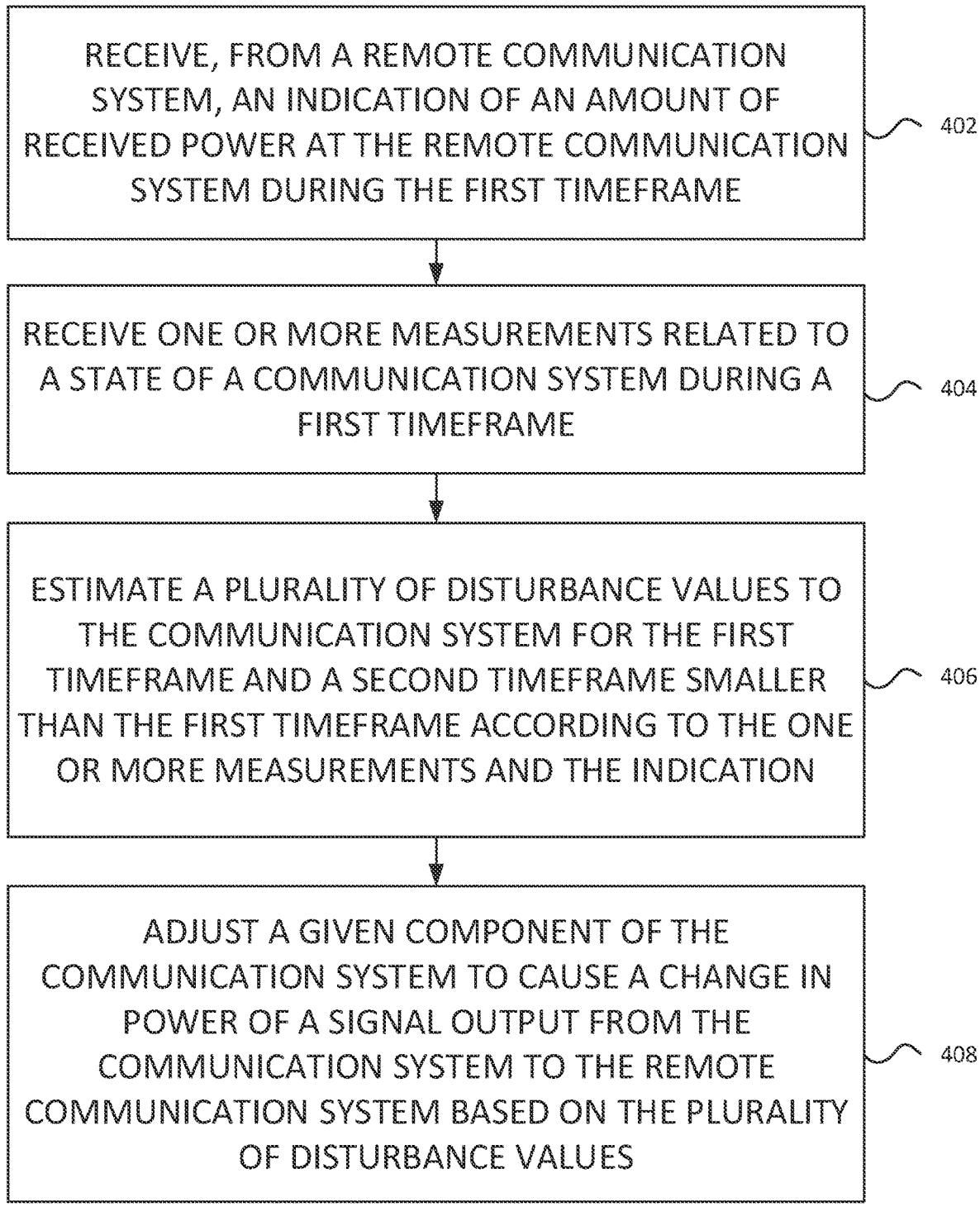
FIG. 4 is a flow diagram 400 depicting a method in accordance with aspects of the disclosure.

While connected, the one or more processors 104 of the first communication device 102 and/or the one or more processors 124 of the second communication device 122 may adjust power to a communication link with a remote communication system as further described below. In FIG. 4, flow diagram 400 is shown in accordance with aspects of the disclosure that may be performed by the one or more processors 104 and/or the one or more processors 124. While FIG. 4 shows blocks in a particular order, the order may be varied and that multiple operations may be performed simultaneously. Also, operations may be added or omitted.

At block 402, the one or more processors 104 of the first communication device 102 receive an indication of an amount of received power for a communication link 22 from the second communication device 122 during a first timeframe. The indication may be a relative received signal strength indicator or other type of measurement. The indication may be received via an optical signal, a RF signal, etc. from the second communication device 122. The indication may be received continually or at regular intervals, such as every 0.1 seconds or more or less. Each indication may be stored in the memory 106 of the first communication device. In one scenario, the first timeframe may be on the order of months, weeks, or days, or more or less. In some implementations, the indication may include a first measurement related to a received power of a beacon beam and a first measurement related to a received power of a communication beam.

At block 404, the one or more processors 104 also receive measurements related to a state of the first communication device 102 during the first timeframe. The measurements may be received from the one or more sensors 118 of the first communication device 102 and may include, for example, orientation of the first communication device, frequency of vibration of the first communication device, output power, altitude, humidity, temperature, etc. The measurements may be received continually or at regular intervals, such as every 0.1 seconds or more or less. Each measurement may be stored in the memory 106 of the first communication device.

At block 406, the one or more processors 104 estimate one or more disturbance values to the first communication device 102 according to the received indication and the received measurements. Each disturbance value may be an average amount of change in power over a given timeframe. A first disturbance value may be estimated by determining an average amount of change of the indication over a second timeframe, for instance which is equal to or on the same order of the first timeframe. The second timeframe may be selected according to a first time constant for variation of a component of the first communication device 102. The first time constant may be the amount of time over which a measurement related to the component changes by a predetermined factor, such as a factor of $1-1/e$ (or approximately 0.6321). The first time constant may be known or may be determined using the received measurements. In particular, the first time constant may be a known or predicted time constant for a degradation, or decay, of the component. The second timeframe may be equal to the first time constant. For example, the second timeframe may be a month, which may be the time constant for a degradation of the photodiode detector, the EDFA and/or the seed laser by a factor of $1-1/e$.

Then, a second disturbance value may be estimated by subtracting the first disturbance value from the received indication and then determining an average amount of change of the power over a third timeframe that is less than the second timeframe. The third timeframe may be selected according to a second time constant for variation of another component of the first communication device 102. The second time constant may be the amount of time over which a measurement related to the other component changes by the same predetermined factor, such as a factor of $1-1/e$. The third timeframe may be equal to the second time constant. Additional disturbance values for additional timeframes may be determined in a similar manner.

Estimating the one or more disturbance values may include identifying one or more components of the first communication device 102 to be associated with each disturbance value. The identification of a component may include determining that a time constant for the variation of the component is a same or similar value as the timeframe for an estimated disturbance value. For instance, a known or predicted time constant for the degradation of the component may be the same or similar to the timeframe for the estimated disturbance value. The identification of a component may also include determining that a detected change in the received measurements associated with the component is a likely cause of an estimated disturbance value. For example, the detected change may occur in the same timeframe as the estimated disturbance value. In addition, the identification of a component may include identifying a known change in behavior of a component associated with a received measurement, such as differences in an amount of output due to altitude, temperature, humidity, or other type of environmental measurement.

At block 408, the one or more processors 104 adjust a given component of the first communication device 102 to cause a change in power of a communication signal output from the first communication device 102 over the communication link 22 according to the one or more disturbance values. Adjusting the one or more components may include controlling the transmitter 112 to increase or decrease power of the output signal. For example, the transmitter 112 may adjust the power of the output signal at a rate equal and opposite to a predicted amount of decrease due to the one or more disturbances. The adjustment to the transmitter 112 may be a power adjustment to the beacon beam, the communication signal, or both. This power adjustment may be performed by using the SMVOA to control an amount of the beacon beam that is fed into the EDFA and/or adjusting the output of the EDFA. In some examples, the power adjustment may be performed by reducing or increasing a number of channels in the communication signal or by adjusting protection mechanisms for a particular receiver. Adjusting the one or more components may also include controlling the steering mechanism 116 to adjust a pointing direction of the optical signal, adjusting a threshold in one or more algorithms, or changing a photodetector amplifier gain electrically.

Alternatively, the one or more processors 104 may determine no adjustment is needed when no component is identified as being associated with the one or more disturbance values. No component may be identified when the disturbance to the received indication has characteristics associated with an obstacle between the first communication device 102 and the second communication device 122. For example, the characteristics may include some fraction of the initial signal drop during a fade was steeper than a threshold, the signal power has dropped below to a set minimum threshold, or the signal power has remained below the set threshold for a certain amount of time. The one or more processors 104 may pause some operations related to the communication link to conserve energy while the obstacle is detected, determine when an obstacle is gone, and resume operation.

In some implementations, the one or more processors 104 may also predict a future disturbance value associated with one or more components based on the received measurements and/or predicted behavior of the one or more components over time. Based on the future disturbance value, the one or more processors 104 may schedule adjustments to a given component of the first communication device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of adjusting power output over a communication link, the method comprising:
   receiving, by one or more processors of a first communication device, signal power information from a second communication device;
   estimating, by the one or more processors, a plurality of disturbance values based on the signal power information, wherein each of the plurality of disturbance values is an average amount of change in power over a given timeframe; and
   adjusting, by the one or more processors, power of a communication signal output by the first communication device over the communication link based on the estimated disturbance values.

2. The method of claim 1, wherein the signal power information includes an indication of an amount of received power for the communication link during a first timeframe.

3. The method of claim 2, wherein the indication is a relative received signal strength indicator.

4. The method of claim 2, wherein the indication is received via an optical signal from the second communication device.

5. The method of claim 2, wherein the indication is received via a radio frequency (RF) signal from the second communication device.

6. The method of claim 2, wherein the indication is received continually or at regular intervals.

7. The method of claim 2, further comprising:
   storing, by the one or more processors, the indication in a memory.

8. The method of claim 2, further comprising:
   receiving, by the one or more processors, one or more measurements related to a state of the first communication device during the first timeframe.

9. The method of claim 8, wherein estimating the plurality of disturbance values is further based on the received one or more measurements.

10. A first communication device comprising:
    one or more processors configured to:
    receive signal power information from a second communication device;
    estimate a plurality of disturbance values based on the signal power information, wherein each of the plurality of disturbance values is an average amount of change in power over a given timeframe; and
    adjust power of a communication signal output by the first communication device over a communication link based on the estimated disturbance values.

11. The first communication device of claim 10, wherein the signal power information includes an indication of an amount of received power for the communication link during a first timeframe.

12. The first communication device of claim 11, wherein the indication is a relative received signal strength indicator.

13. The first communication device of claim 11, wherein the indication is received via an optical signal from the second communication device.

14. The first communication device of claim 11, wherein the indication is received via a radio frequency (RF) signal from the second communication device.

15. The first communication device of claim 11, wherein the indication is received continually or at regular intervals.

16. The first communication device of claim 11, further comprising a memory, wherein the one or more processors are configured to store the indication in the memory.

17. The first communication device of claim 11, wherein the one or more processors are configured to receive one or more measurements related to a state of the first communication device during the first timeframe.

18. The first communication device of claim 17, wherein the estimation of the plurality of disturbance values is further based on the received one or more measurements.

* * * * *